United States Patent [19]
Kimball et al.

[11] Patent Number: 5,859,959
[45] Date of Patent: *Jan. 12, 1999

[54] COMPUTER NETWORK WITH DEVICES/ PATHS HAVING REDUNDANT LINKS

[75] Inventors: Karen Kimball, Sacramento; Alan Albrecht, Granite Bay, both of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 639,605

[22] Filed: Apr. 29, 1996

[51] Int. Cl.$^6$ .................................................. G01K 31/08
[52] U.S. Cl. ................ 395/182.02; 395/200.69; 370/216
[58] Field of Search ..................... 395/180, 181, 395/182.01, 182.02, 200.68, 200.69; 371/68.2, 68.1, 20.1; 326/9, 10; 370/216, 227, 228

[56] References Cited

U.S. PATENT DOCUMENTS

| | | |
|---|---|---|
| 4,490,788 | 12/1984 | Ramussen . |
| 5,260,945 | 11/1993 | Rodeheffer . |
| 5,485,465 | 1/1996 | Liu et al. ............................ 395/182.02 |
| 5,506,956 | 4/1996 | Cohen ................................. 395/182.04 |
| 5,623,482 | 4/1997 | Okanoue ................................. 370/224 |

*Primary Examiner*—Albert DeCady

[57] ABSTRACT

A dual-connection option allows preservation of network connectivity to a device or path by providing a second, redundant connection which takes over if a first connection fails. One goal is to provide communication with all critical devices at all times. If the ability to communicate with a device is lost because part of the connection to the device or the device itself has been destroyed, recovery from such loss is provided. The invention is preferably embodied in a particular implementation of the proposed Redundant Links standard, and satisfies the requirements of the proposed IEEE 802.12 standard, while adding specific enhancements to the proposed standard, such as storing and/or reporting conditions that lead up to a failure; accommodating minor, temporary disruptions; allowing status inquiries with regard to a redundant link while maintaining a primary connection; and continuing testing the redundant link after an initial verification.

18 Claims, 8 Drawing Sheets

✘ - Link fault
Active links shown on bold

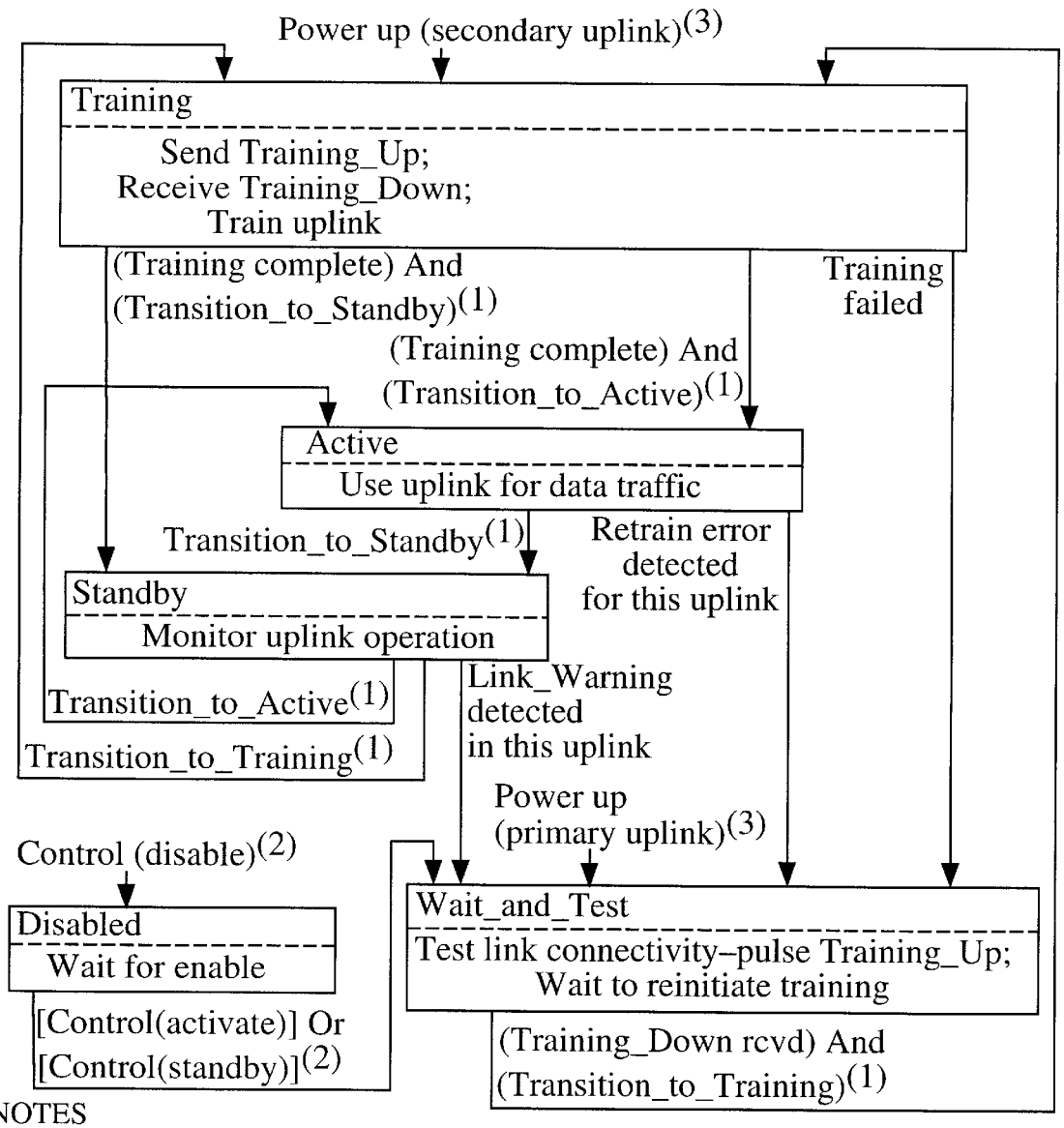

NOTES

1 – Transitions between meta-states defined as Transition_to_"x" may be the result of either an internal RMAC decision (e.g., after a failure in the other uplink, training was for the secondonary uplink, etc) or the receipt of a network management acLinkAdministrativeControl (x) action.

2 – Transitions defined as Control (x) are acLinkAdministrativeControl (x) actions initiated by network management. A Control (disable) will cause a direct transition from any other meta-state to Disable.

3 – The initial meta-state after power up depends on whether the uplink is the primary or secondary uplink. The primary uplink waits to be trained until the secondary uplink either is trained and in Standby or has failed training and is in Wait_and_Test. The RMAC then initiates a Transition_to_Training for the primary uplink.

Fig. 7 (PRIOR ART)

COMPUTER NETWORK WITH DEVICES/ PATHS HAVING REDUNDANT LINKS

BACKGROUND OF THE INVENTION

1. Technical Field

The invention relates to the exchange of information over an electronic network. More particularly, the invention relates to providing a redundant connection for devices and/or paths within an electronic network.

2. Description of the Prior Art

It is desirable to preserve network connectivity to a device or path in an electronic network. To this end, it is often preferred to provide a dual connection to network devices and/or paths where a second, redundant connection takes over if a primary connection fails. Such arrangement provides for greater network reliability.

Two broad approaches to providing such redundancy are presently known in the prior art:

One type of redundant connection concerns an Open Systems Interconnection (OSI) layer-1 (physical layer) implementation. This implementation is based on hardware signals which indicate whether or not the connection itself, and possibly a device at the other end, is functioning properly. If these signals cease, it is assumed that either the device or the cable link to the device have gone down, and that the redundant connection should be activated. An example of this solution involves using 10Base-T linkbeat (also known as linkpulse) to detect a working connection to a device which is powered-up.

While this type of solution can be implemented purely in hardware, and is thus inexpensive, it does not account for the possibility that network management may have been configured so that network communications cannot occur across the link, even when hardware signals are possible. For instance, if the device at the other end of the connection is configured for security and the device instigating the redundant connection does not match the permitted configuration on one or both of its connections, these offending links are essentially unusable. Moreover, the network administrator cannot be informed of this. In the case of such a non-permitted configuration, a redundant dual-connection does not really exist because one or both links cannot establish a connection.

The second type of redundant connection concerns the Open Systems Interconnection (OSI) layer-2 (MAC layer) implementation. This implementation is based on the exchange of network packets with a specific device, and requires both devices to have a network protocol stack. If the target device fails to respond to the packets, that device or its connecting cables are presumed to be inactive. Switching over to the redundant connection opens an alternate path to that target device. An example of this solution is the Backup Links feature provided on Hewlett-Packard Company's (Palo Alto, Calif.) 10Base-T hubs or, to a certain extent, the IEEE 802.1d Spanning Tree Protocol implemented in most standard network bridges.

This second solution can indicate whether the instigating device's immediate neighbor approves of its configuration but, to prevent network loops, the redundant connection cannot be tested without disrupting the main connection. The ability to respond to a trouble condition is also slower with this method than with the first method due to round-trip packet propagation time and the possibility of the target device being temporarily busy, which must be accounted for before a failure can be determined.

The IEEE 802.12 committee is currently in the balloting process for a Redundant Links feature definition to be included in the 802.12 standard for 100VG-AnyLAN networks. See Draft Standard, Information Technology, Local and Metropolitan Area Networks - Part 12: Demand-Priority Access Method, Physical Layer and Repeater Specifications for 100 Mb/s Operation - Redundant Links, Draft 3.0, LAN MAN Standards Committee, IEEE Computer Society, March 1996.

The redundancy feature, as described in the implementation proposed for the standard, is closer to the first type of Redundant Links solution (described above) than to the second. The proposed standard describes a general sequence of hardware meta-states through which a main and redundant uplink connection pass. There is freedom for individual implementers to decide the exact impetus for a transition from one meta-state to the next, and the severity of the conditions which cause such a transition.

In the proposed standard, redundant links are provided such that "both end nodes and repeater cascade ports may optionally be equipped with a second (redundant) link to maintain connectivity in case of individual link or repeater failure in the network connection path." (ibid. ) To better understand the environment in which the subject invention operates, as well as the limitations imposed by the prior art, a brief discussion of a typical network and device/path redundancy is now provided.

For an 802.12 repeater with redundant links, the purpose of such redundancy is to maintain network connectivity for all of a repeater's lower entities in the event of a failure in either of the repeater's uplinks or a connected higher-level repeater. FIG. 1 is a block schematic diagram of a topology that maintains network connectivity for any repeater experiencing a single uplink failure or failure to one connected higher-level repeater. The proposed standard provides that all redundant links shall be connected within the same arbitration domain and shall be connected in a manner that maintains a star topology, but does not result in a network loop for any combination of active links. One level-2 repeater is preferably designated as the alternate-root repeater. The alternate-root repeater preferably has both uplinks connected to local ports on the root repeater. All non-alternate-root, level-2 repeaters preferably have one uplink, designated as the primary uplink, connected to a local port on the root repeater, and the other uplink, designated as the secondary uplink, connected to a local port on the alternate-root repeater. All level-3 and lower repeaters preferably have their two uplinks connected to local ports on different repeaters at the next higher level.

As shown on FIG. 2, failure of the (primary) uplink between a level-2, non-alternate-root repeater and the root repeater can cause an extension of the root-repeater-to-lowest-end-node distance. It is therefore preferred that user implementation of this system ensures that the longest path distance between the root repeater and the lowest end node, including any added levels due to the level-2 standby link connection, does not exceed the maximum topology length defined in the standard. The primary uplink from a level-2, non-alternate repeater should be the active link whenever that link is operational.

When non-redundant-link repeaters are interconnected with redundant-link repeaters in the same fault-tolerant network, a repeater without redundant-uplink capability loses network connectivity if its uplink or the connected higher-level repeater fails. To minimize connectivity loss, non-redundant-link repeaters may be used as a root repeater, because root repeaters do not require a cascade port or any uplinks; or they may be connected at the lowest repeater level in a cascade. However, a non-redundant-link repeater is preferably not used as an intermediate repeater in a cascade. For example, with regard to FIG. 3, the failure of the root repeater or failure to the repeater 2a uplink results in loss of connectivity, not only for repeater 2a end nodes, but also for all lower repeaters and their end nodes in the cascade.

FIG. 4 is a block schematic diagram showing connections in a network for redundant links from end nodes. End nodes that are equipped with multiple MAC adapters may be connected to repeaters at any level in the network. However, to ensure maximum recoverability of network connectivity from single link or single repeater failures, alternate links from the same end node should be connected, such that the alternate network paths do not contain any instance where both paths use the same link or the same repeater. It is preferred that redundant end node links be connected to local ports on redundant link repeaters.

The network shown in FIG. 4 provides examples of both properly and improperly connected redundant-link end nodes. The alternate connections of end nodes x, y, and z have no common redundant path elements and can recover network connectivity in case of a single link or single repeater failure anywhere in the network. The alternate connection for end nodes r, s, and t each have common path elements and may not recover connectivity in the case of repeater or link failure. Thus, end node r loses most of its network connectivity if repeater 2c fails; end node s loses most of its network connectivity if repeater 3a's uplink fails, and all of its connectivity if repeater 3a, itself, fails; and end node t loses most of its network connectivity if repeater 2b fails.

While the proposed IEEE standard for 802.12 offers such redundancy, the proposed standard does not address such issues as storing and/or reporting conditions that lead up to a failure; accommodating minor, temporary disruptions; allowing status inquiries with regard to a redundant link while maintaining a primary connection; and continuing testing the redundant link after an initial verification. It would be advantageous to provide such enhancements to a network redundancy scheme, such as that set forth in the proposed standard.

SUMMARY OF THE INVENTION

The invention allows preservation of network connectivity to a device or path by providing a dual-connection option where a second, redundant connection takes over if a first connection fails. This arrangement allows for greater network reliability, whether such reliability is required for a critical system application or for a simple data-processing environment. A key goal of the invention is to provide communication with all critical devices at all times. If the ability to communicate with a device is lost because part of the connection to the device (or the device itself) has been destroyed, then the invention provides the ability to recover from such loss. The invention is preferably embodied in a particular implementation of the proposed Redundant Links standard, and satisfies the requirements of the proposed 802.12 standard, while adding specific enhancements to the proposed standard. For example, the invention provides such heretofore unavailable features as storing and/or reporting conditions that lead up to a failure; accommodating minor, temporary disruptions; allowing status inquiries with regard to a redundant link while maintaining a primary connection; and continuing testing the redundant link after an initial verification.

BRIEF DESCRIPTION OF THE DRAWINGS

FIG. 7 is a block schematic diagram of a cascade-port/uplink meta-state for redundant-uplink repeaters.

DETAILED DESCRIPTION OF THE INVENTION

This invention provides a redundant connection for devices and/or paths within an electronic network that includes both a hardware component and a system software (hereinafter referred to as the "system") component.

Figure 1:
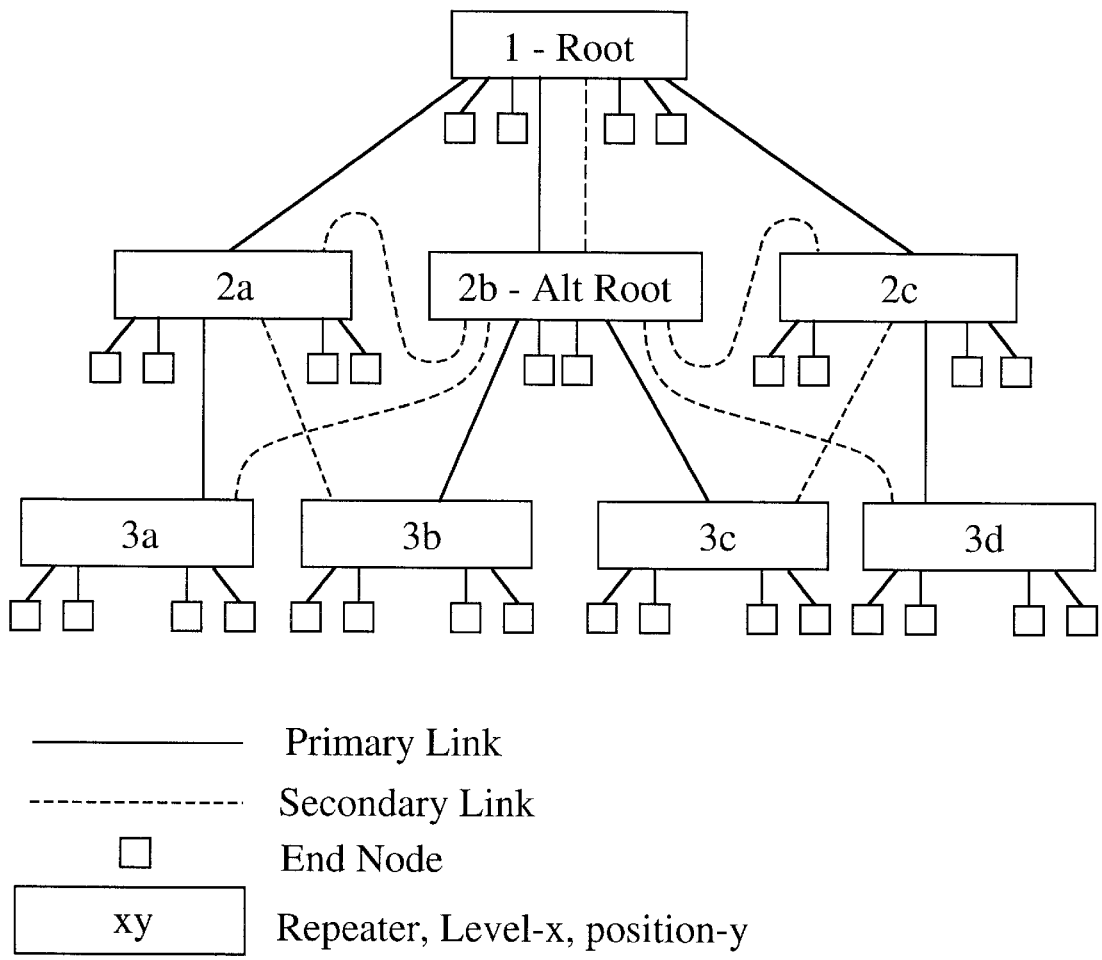
FIG. 1 is a block schematic diagram of a topology that maintains network connectivity for any repeater experiencing a single uplink failure or failure to one connected higher-level repeater.
Figure 2:
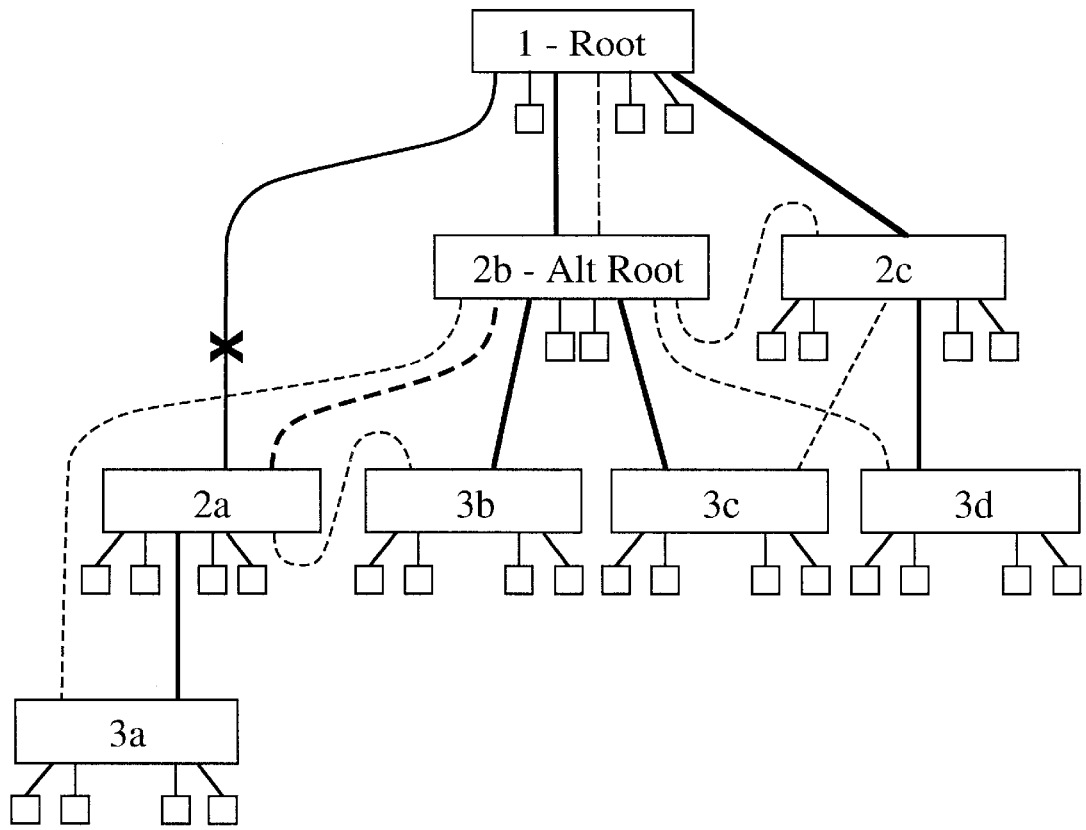
FIG. 2 is a block schematic diagram showing an extended root-repeater-to-lowest-end-node distance due to link failure.
Figure 3:
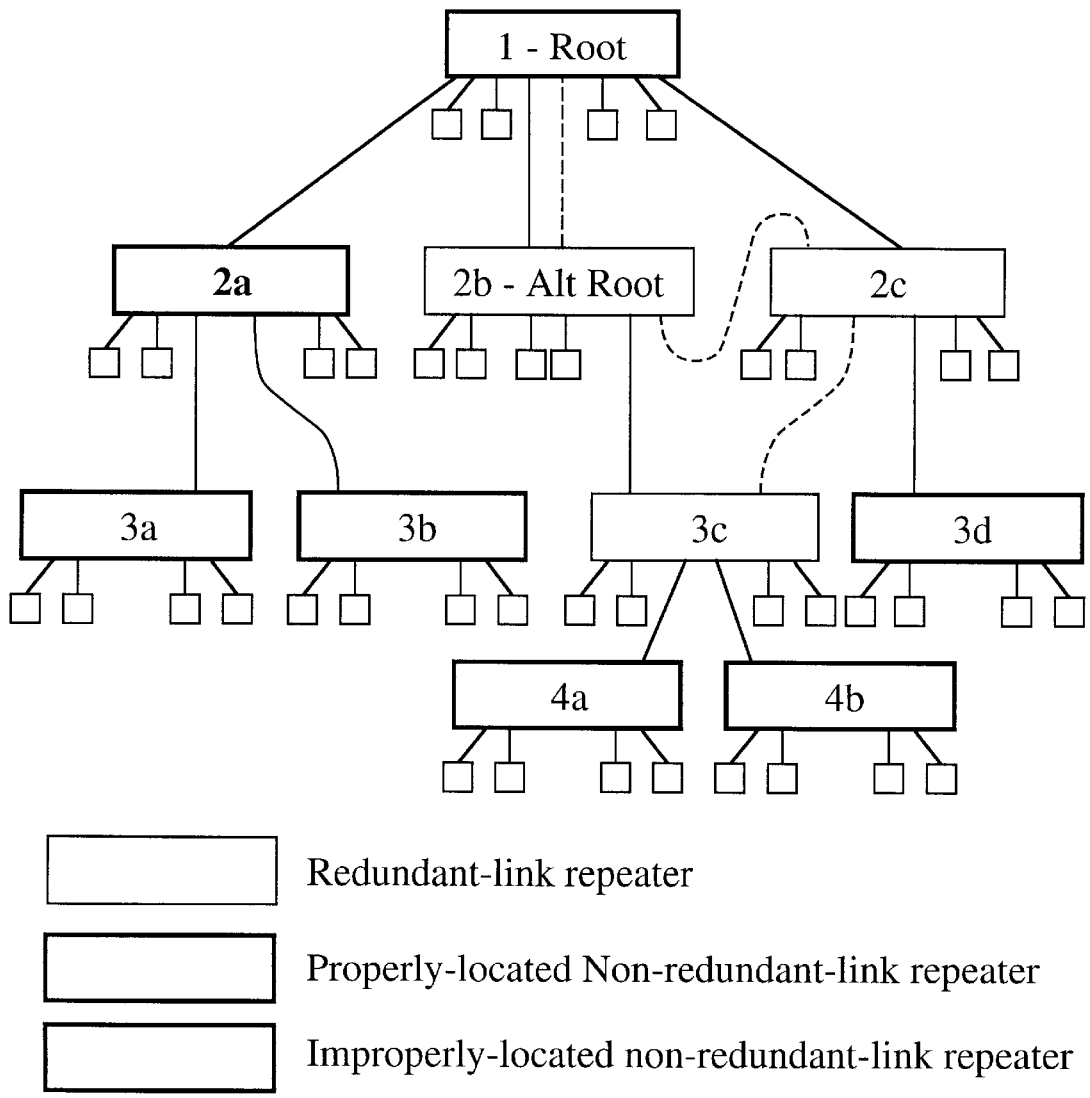
FIG. 3 is a block schematic diagram of a network with both redundant-link and non-redundant-link repeaters.
Figure 4:
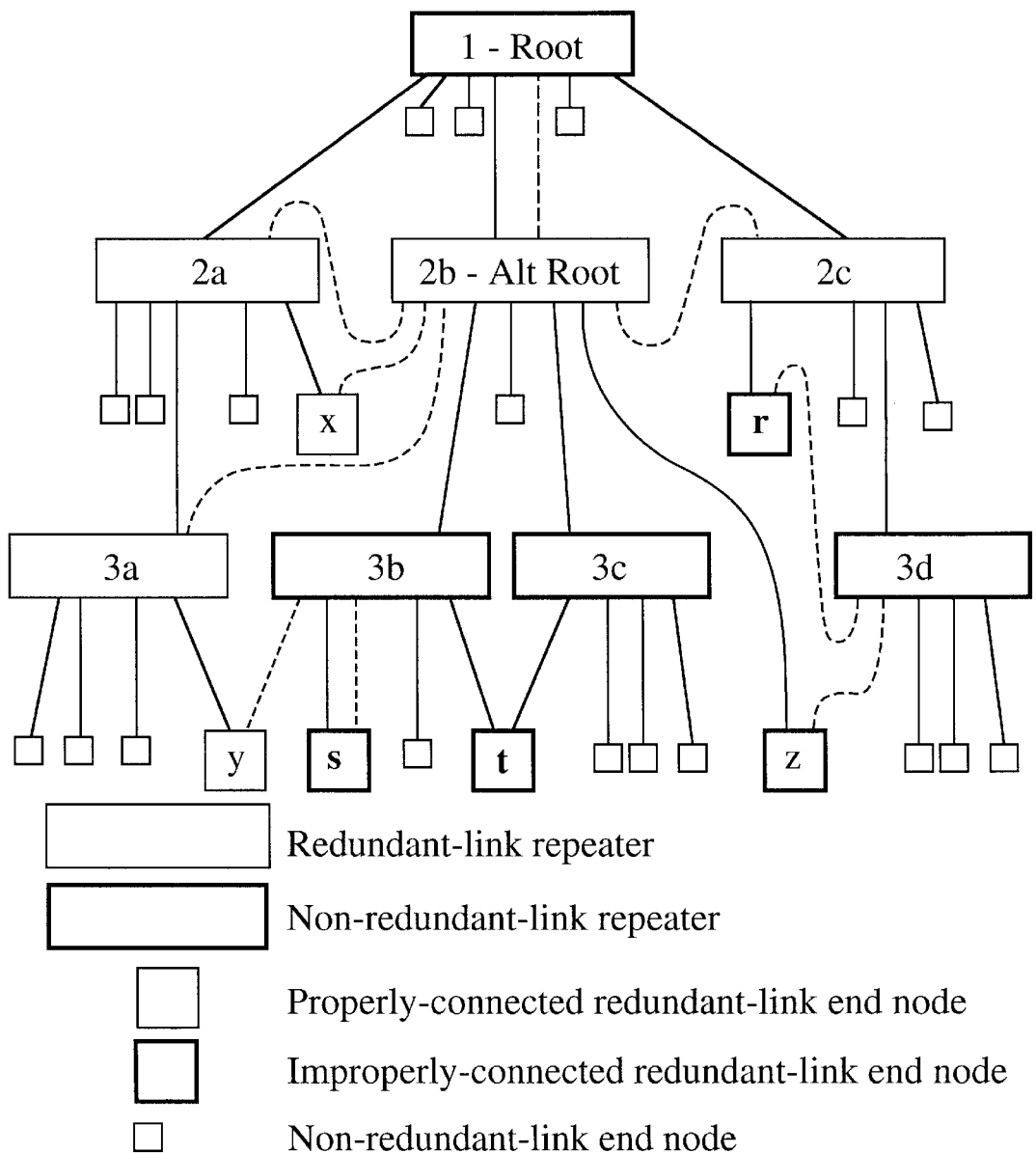
FIG. 4 is a block schematic diagram showing connections in a network for redundant links from end nodes.
Figure 5:
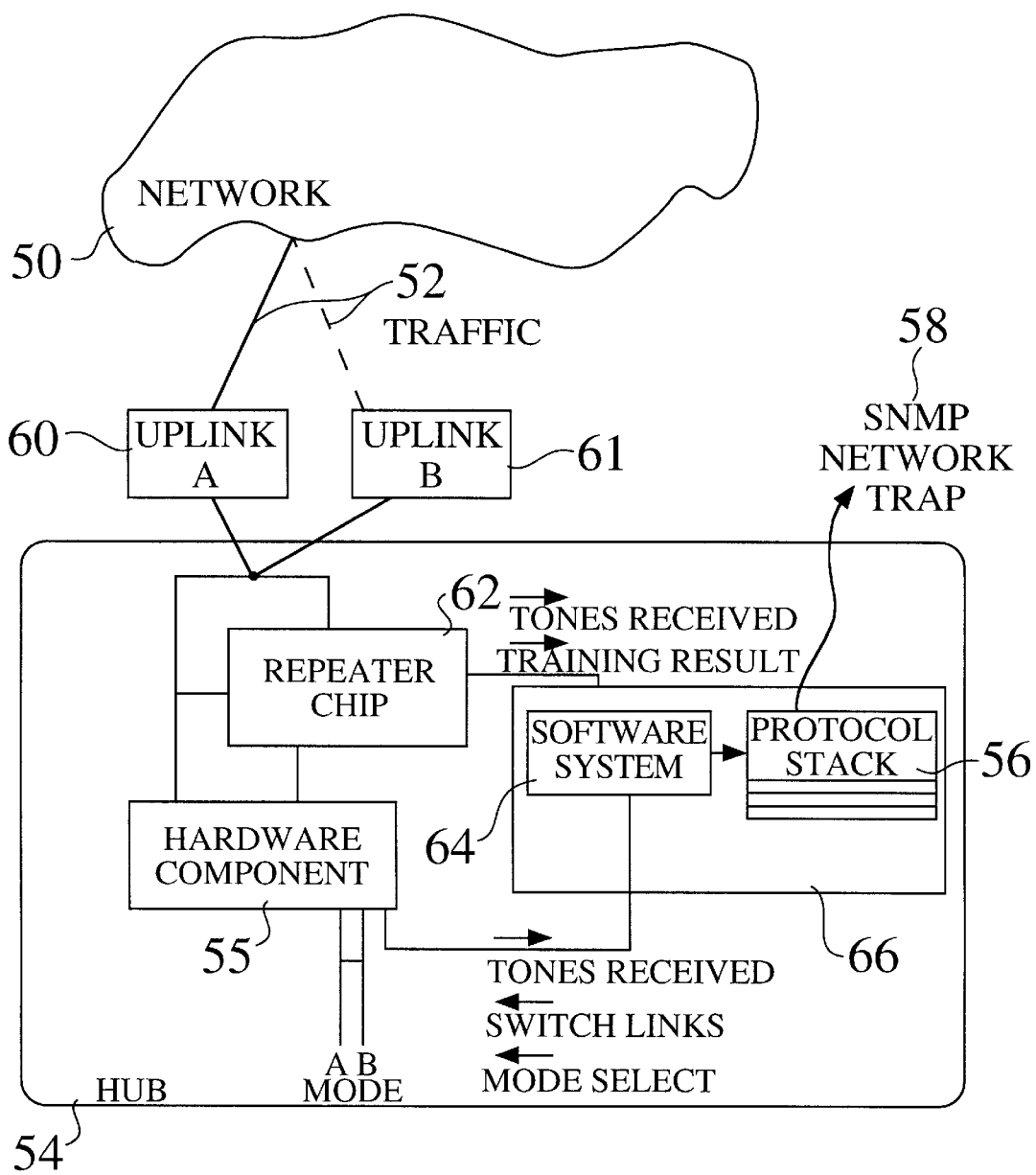
FIG. 5 is a block schematic diagram of a network hub that incorporates an enhanced redundancy apparatus in accordance with the invention.

FIG. 5 is a block schematic diagram of a network 50, including a network hub 54 having two uplinks—uplink A 60 and uplink B 61 that are configurable to handle network traffic 52. The hub incorporates an enhanced redundancy apparatus in accordance with the invention. While a hub is shown for purposes of this discussion, it will be appreciated that the invention is readily applied to any other type of network device and/or connection.

The hardware component, which may operate in conjunction with a standard repeater circuit, such as the repeater chip 62, is provided in a combinational logic circuit or storage device 55 configured to implement a logic function, for example as a programmable array logic device (PAL), having two modes, one of which acts as a redundant connection (hereafter referred to as the "standby connection"). In one embodiment of the invention, where the system may be implemented with the proposed IEEE 802.12 standard for 100VG-AnyLAN networks, the first mode (mode A) maintains an 802.12 aLinkStatus Standby state which is instigated by the hub's own attached 802.12 repeater chip so long as the other end of the connection is not broken.

If the connection can be fully trained, the hardware component maintains the Standby state by asserting the proper 802.12 signal sequences and absorbing and dropping any 802.12 packets received. If the connection cannot be fully trained, the hardware component's other mode (mode B) is used. In this second, degraded mode, the hardware component bursts up an 802.12 training idle signal every 200 microseconds to cause any device at the other end to perform an 802.12 training tones handshaking procedure. The hardware component includes a Tones Received status that is provided to the hub's system 66 and is received by the software system 64, and which in mode A indicates that the Standby state is still being maintained, and which in mode B indicates that the device at the other end is responding to the training tones.

The system makes use of the hardware component, and of 802.12 network management information, to determine the viability and continued health of the dual connections. There are two main stages to this solution:

The first stage of the solution involves resetting all state information and attempting to verify fully the standby link. This occurs any time the user enables the RedundantLinks feature, or any time the user transitions the Uplink port from disabled to enabled or changes the uplink connection that is selected as the main link.

The second stage of the solution involves monitoring the main link to detect any problems with the link, possibly switching to the standby link, and periodically checking the standby link to assure that its connection has not worsened.

The system attempts to train the standby 802.12 Uplink connection fully with the hardware component in mode A. If the link can be fully trained, it is considered healthy and the system switches over to the main link to begin monitoring. If the standby link cannot be fully trained, it is considered degraded. In such event, the system captures a snapshot of the reason for failure using a combination of the 802.12 aTrainingResult network management object and a system status condition that is based on whether training tones were received from the connected device (in the preferred embodiment of the invention, this latter feature uses the AT&T ATT2R02 802.12 repeater chip status). This information determines for the user whether the link is failing due to a network management configuration or permissions problem, or due to the lack of a healthy device or physical connection at the other end.

In alternative embodiments of the invention, an SNMP network trap 58 indicating the link failure problem may be sent out if the system includes a network protocol stack 56. Because the standby link is degraded, the system sets the hardware component to mode B so that the presence of a live device or connection may be detected later without disruption to the main link. The system then switches over to the main uplink connection and begins monitoring.

Once monitoring is begun, the system inspects the main link every second to see whether a good connection has been obtained or lost, and may make a decision based on that information. As a part of such monitoring, the system also checks the standby connection every ten seconds to see whether that connection has worsened since the last check.

A connection is considered good only when it is fully trained (i.e. the connection's 802.12 aLinkStatus management object value is Active). The system begins operation with an UpLinkEstablished value of False, where it attempts to get the main link to train. If a link becomes or remains trained, the system enters the state where UpLinkEstablished is True.

If the link never becomes trainable, or if it was once trained and later becomes untrainable, the system immediately checks the standby link and makes a decision. If the standby link appears to be better than the main link, the system switches over to the standby link after collecting failure information to help the user. If the links appear to be the same or if the main link is still better than the standby link, the system does not switch over but may still collect the failure information if the user has not already been informed of such a failure. The user is informed either when a previously good link is lost, or if the failure of the main link has not been reported since monitoring began. The system captures a snapshot of the reason for failure, using the criteria described above for the initial standby link failure and, if the system includes a network protocol stack, an SNMP network trap indicating the link failure problem is sent.

The following table shows whether the standby link is considered better than the main link and what action is to be performed in each case. If the standby link is fully trained using mode A of the hardware component and the hardware component's TonesReceived status is true (indicating that the standby link's 802.12 aLinkStatus management object value is still Standby), the standby link is better than the main link if the main link is anything but Active. If the standby link is not fully trained (i.e. the hardware component is in mode B), if the hardware component's TonesReceived status is true, indicating a healthy connection to a live device at the other end, and if the main link is not receiving any tones from the device at its other end, then the standby link is better. In all other cases, the main link is considered to be the same as or better than the standby link and no switch occurs.

TABLE 1

REDUNDANT LINKS STATE DECISION

| Main Link | Standby Link | Collect Failure Information On Link, Send Trap If Protocol Stack | Action |
|---|---|---|---|
| Active | Standby | Neither | None |
| Active | Degraded (with TonesRcvd) | Standby Link | None |
| Active | Degraded (no TonesRcvd) | Standby Link | None |
| Training (with TonesRcvd) | Standby | Main Link | Switch to Standby |
| Training (with TonesRcvd) | Degraded (with TonesRcvd) | Both Links | None |
| Training (with TonesRcvd) | Degraded (no TonesRcvd) | Both Links | None |
| Training (no TonesRcvd) | Standby | Main Link | Switch to Standby |
| Training (no TonesRcvd) | Degraded (with TonesRcvd) | Both Links | Switch to Standby |
| Training (no TonesRcvd) | Degraded (no TonesRcvd) | Both Links | None |

The main link is considered to be untrainable under the following circumstances:

If the main link's 802.12 aLinkStatus management object value is not Active at the first check, wait up to 2 more seconds if the UpLinkEstablished status value is False, or wait up to 1 more second if the UplinkEstablished status value is True, before checking again whether the link is Active. This avoids needless panicking over a link that has not recently been determined to be good, but allows a quick response time for a good link which fails. In this latter case, the good link is given one more opportunity to become Active to avoid switching if the link is just momentarily disrupted, i.e. the condition must persist before action is taken but action is still taken quickly.

There is an exception to the failure requirements for both values of UpLinkEstablished. That is, if no live device appears to be connected at the other end, the decision over whether to switch from the main to the standby link is made immediately. The lack of a connected live device is indicated by an absence of received training tones. If tones are not received when first checked, the system waits up to 100 milliseconds and checks again, because the Uplink port may be in a training backoff period where it does not send the necessary signals to cause tone response from the other device.

Information obtained from the background or on-demand checking of the standby link after monitoring has begun may also result in the system making a change to the hardware component's operating mode, and may also result in failure information being supplied to the user. If the standby link is fully trained, ie. 802.12 aLinkStatus management object value was Standby and the hardware component was in mode A, and if the hardware component's TonesReceived status indicates that full training has been lost, the system sets the hardware component into mode B (degraded mode) and collects failure information for the user and, optionally, also sends out an SNMP network trap indicating the failure. Once the hardware component is in mode B, no further worsening of the standby link's status is of interest so long as the monitoring cycle is not reinitialized.

Figure 6A:
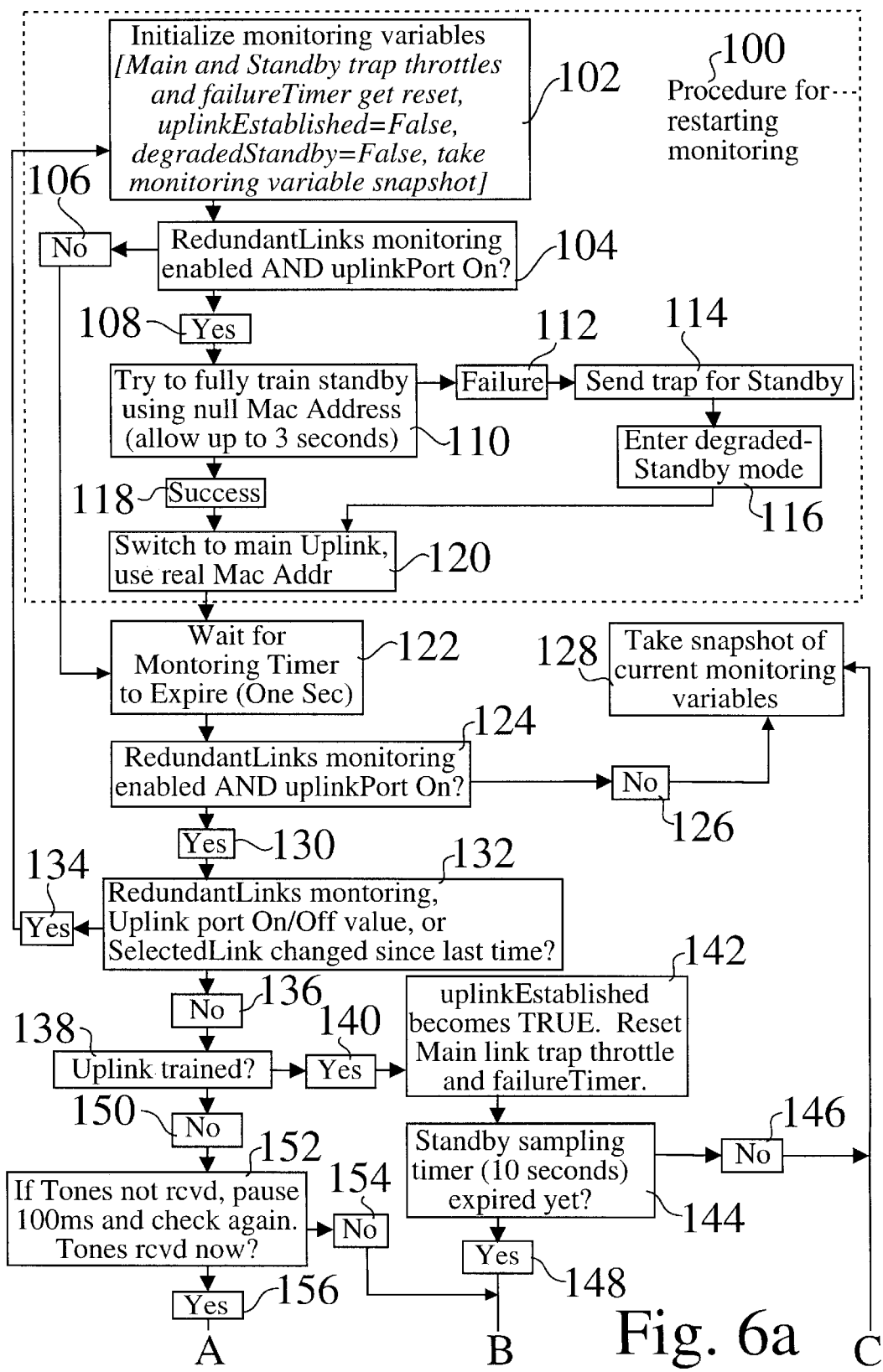
FIGS. 6a and 6b provide a flow diagram of a system for implementing a redundant links technique in an electronic network in accordance with the invention.
Figure 6B:
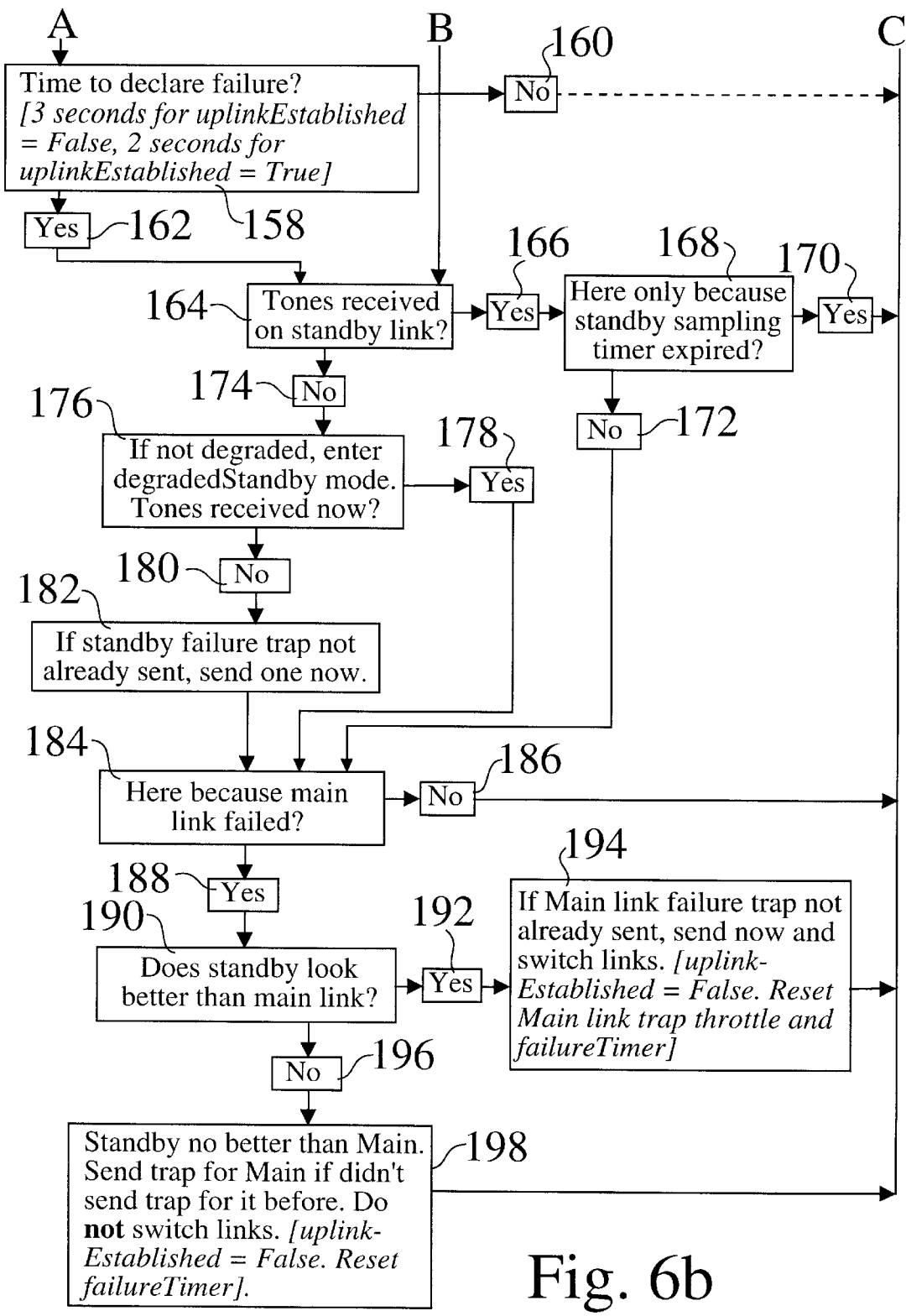

FIGS. 6a and 6b provide a flow diagram of a system for implementing a redundant links technique in an electronic network in accordance with the invention. A first aspect of the invention is identified on the figure with regard to a procedure for restarting monitoring (100 ). Monitoring variables are initialized (102) such that the Main and Standby trap throttles and the failure Timer are reset, uplink Established=False, degradedStandby=False, and a monitoring variable snapshot is taken.

If the RedundantLinks monitoring is not enabled and/or the UplinkPort is not on (106), then the system enters the Wait for Monitoring Timer to Expire state (122) to wait for new conditions which would trigger restarting monitoring.

If the RedundantLinks monitoring is enabled and the uplinkPort is on (104, 108), then the system tries to fully train the standby uplink using a Null Mac Address (allowing up to three seconds to train) (110). If training is successful (118), then the system switches to the main Uplink and uses a real Mac Address (120). If training fails (112), then a trap is sent for the Standby (114) and the system enters a degradedStandby mode (116). Thereafter, the system switches to the main Uplink and uses a real Mac Address (120). In both cases, the system next enters a large loop wait state, the Wait for Monitoring Timer to Expire state (122) which is one second in duration.

The Wait for Monitoring Timer to Expire state (122) is the launching point for one of the following: monitoring directly; reinitializing the system with the expectation of beginning monitoring the next cycle; or determining that monitoring is not to occur yet and waiting once again for a change in conditions which would restart monitoring. A general determination of whether conditions are such that monitoring is to occur will happen at each expiration of the timer in this large loop wait state (122).

After expiration of the Monitoring Timer (122), the system determines if RedundantLinks monitoring is enabled and the uplinkPort is on (124). If not (126), the system takes a snapshot of the current monitoring variables (128) and returns to the Wait for Monitoring Timer to Expire state (122) to wait for the timer expiration, when it will make new determinations as to whether to monitor. Otherwise (130), the system determines if any of the RedundantLinks monitoring, uplinkPort On/Off, or SelectedLink values have changed since they were polled (132) after last expiration of the timer. If so (134), the system is reinitialized (102) and will later return to the Wait for Monitoring Timer to Expire state (122) with the expectation of beginning monitoring.

Otherwise (136), all system variables are such that monitoring is to occur this cycle. The system then determines if the Uplink is trained (138). If so (140), the value for uplinkEstablished becomes true, and the Main link trap throttle and failure timer are reset (142). A ten-second standby sampling timer is then checked for expiration (144). If the timer has not timed out (146), the system takes a snapshot of the current monitoring variables (128) and returns to the Wait for Monitoring Timer to Expire state (122). Otherwise (148), the system determines if Tones have been received on the standby link (164), as discussed more fully below.

If the Uplink is not trained (150), then the system determines if Tones have not been received, pauses 100 milliseconds, and then checks again to see if Tones have been received (152). If not (154), the system determines if Tones have been received on the standby link (164), as discussed more fully below. If Tones are received (156), the system evaluates if a failure should be declared (158) where the failure timer is 3 seconds for uplinkEstablished=False and 2 seconds for uplinkEstablished=True. If a failure is not declared (160), the system takes a snapshot of the current monitoring variables (128) and returns to the Wait for Monitoring Timer to Expire state (122). Otherwise (162), the system determines if Tones have been received on the standby link (164).

If Tones are received on the standby link (164, 166), the system determines if the present status results from expiration of the standby sampling timer (168). If so (170), the system takes a snapshot of the current monitoring variables (128) and returns to the Wait for Monitoring Timer to Expire state (122). Otherwise (172), the system determines if the present status results from a main link failure (184).

If Tones are not received on the standby link (164, 174), the system determines if the connection is degraded. If the connection is not already degraded, the system enters the degradedStandby mode (by changing the hardware component to mode B) and determines if tones are received (176). If tones are not received (180), the system sends a standby failure trap if a trap has not already been sent (182) and then the system determines if the present status results from a main link failure (184). If the tones were not received on the standy link (178), the system determines if the present status results from a main link failure (184).

If the present status does not result from a main link failure (186), then the system takes a snapshot of the current monitoring variables (128) and returns to the Wait for Monitoring Timer to Expire state (122).

If the present status results from a main link failure (188), then the system evaluates whether the standby link is a better link than the main link (190) and, if so (192), determines if the Main link failure trap has already been sent. (194). If the main link failure trap was not yet sent, then the system sends the trap at this time and switches links, where uplinkEstablished becomes False and the Main link trap throttle and failureTimer are reset. The system then takes a snapshot of the current monitoring variables (128) and returns to the Wait for Monitoring Timer to Expire state (122).

Otherwise (196), the system determines that the standby link is no more attractive than the Main link (198). The system sends a trap for the Main link if a trap has not yet been sent, but does not switch links. State variables are reset to uplinkEstablished=False and the failureTimer is reset. The system then takes a snapshot of the current monitoring variables (128) and returns to the Wait for Monitoring Timer to Expire state (122).

EXAMPLE—FAILURE SNAPSHOT

The following is an example of the information that is captured as the failure snapshot, and what is sent in the SNMP trap packet when one of the redundant link connections fails. The preferred embodiment of the invention does not actually make use of all of the information that is available in the failure snapshot. This is based, in part, on the assumption that the trap should alert the user that the link is bad, and then the user should follow up and investigate it to fix the problem. The full snapshot is not typically stored for later examination. Rather, only the information sent out in the trap is saved. However, the system does capture all of the failure information, and such information is sent to the proxy agent which creates a trap. Thus, if it is desirable in other embodiments of the invention that more of the information be included in what is sent to the user, the information is available for the proxy agent to do that.

Failure snapshot captured

Which Physical Link (what external box interface this applies to)

Whether or not this link is the Main or Standby connection

TrainingResult (if this link is actively connected to the repeater chip. If not, this value cannot be known)

Whether or not tones are detected aLinkStatus value for this link, here one of:

Unknown

Standby

Active

LinkFailure

Silent where only the last two values ever occur during such a failure mode.

SNMP Trap sent

Which device this occurred on

Timestamp of when problem occurred (relative to device's power-up)

Which Physical Link (what external box interface this applies to)

aLinkStatus value from above

The preferred embodiment of the invention follows the IEEE 802.12 standard proposed implementation for RedundantLinks in that it attempts to train up the standby link first (here, using the Null Mac Address) and then moves on to the main link (using the repeater's real, non-Null Mac Address), and in that the standby and main links go through the described meta-states for redundant uplinks (as shown on FIG. 7).

The main link goes through the Wait-and-Test, Training, and Active or Wait-and-Test meta-states automatically. The standby link begins in the Wait-And-Test meta-state when the system attempts to train the hardware component in mode A, and it transitions to the Training meta-state. If training is successful, the standby link stays in the Standby meta-state until and if the system detects a problem and sets the hardware component to mode B. If the standby does not succeed in training or later loses its Standby state, the system sets the hardware component to mode B causing the standby link to remain in the Wait-And-Test meta-state until such time as the system has reason to reset all state variables and try once again to establish the standby link before beginning the monitoring cycle once again.

The use of the hardware component to produce the standby link's 802.12 meta-states is a specific, unique implementation of the proposed standard. The hardware component's furnishing of status as to the Standby meta-state (in mode A) or the presence of a healthy device connection (in mode B) are novel enhancements to the standard. The use of the system to drive the global transitions between the meta-states is also a specific, unique implementation of the standard. The system's non-panicking algorithm for the exact conditions and time to determine the failure of the main link, and its collection for the user of failure information on either link, are further, unique enhancements to the standard.

The invention offers the best of both of the types of solutions described above in the "Description of Prior Art" section. By using the combination of hardware and system software described above, the invention offers the quick response time of a purely hardware solution, the ability to detect when the dual connections are not permitted by network management, and the ability to detect that the target device or its connected link are present without disturbing the main link. Further, the invention provides an approach that is less expensive than the test-packet solution because the system software required does not necessitate the overhead of a full network protocol stack.

Additionally, the non-panicking algorithm, which determines if there is a main link failure, accommodates minor, temporary disruptions while still being able to recover rapidly from a real failure. The invention also leverages the power of the 802.12 training authentication process to capture precisely why the links have failed, whether due to network configuration error, security permissions violation, a poor cable connection, or the lack of a healthy target device or connection to it.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A redundant links monitor for an electronic network, comprising:

a status capture module associated with either of a network device or network connection for taking a failure snapshot of at least one of at least two links to a network device/network connection and for verifying viability of said links, wherein said links include a primary link and a secondary link, said status capture module storing and/or reporting conditions that lead up to a link failure, accommodating minor, temporary disruptions, allowing status inquiries with regard to a redundant link while maintaining a primary connection, and/or detecting link failure due to incompatible network security configuration;

periodic means for actively determining the status of said secondary link; and means for selecting the most viable link among said primary link and said secondary link.

2. The redundant links monitor of claim 1, wherein said status capture module is adapted to be polled with respect to said failure snapshot.

3. The redundant links monitor of claim 2, wherein said status capture module may be polled with regard to status of a standby link while an active link is maintained; and wherein said status capture module resides in a repeater environment.

4. The redundant links monitor of claim 1, further comprising:

means for broadcasting said failure snapshot to a network management function.

5. The redundant links monitor of claim 4, said broadcasting means further comprising:

a network protocol stack for generating a network management trap.

6. The redundant links monitor of claim 1, wherein said status capture module includes a tone detector which is operable in a first mode to detect if a standby state is maintained for a secondary link, and is operable in a second mode to detect if a remote device is responding to training tones when maintaining a degraded connection for a secondary link.

7. The redundant links monitor of claim 6, wherein said monitor is adapted to operate in an IEEE 802.12 environment.

8. The redundant link monitor of claim 1, further comprising: a failure timer for establishing an interval during which a primary link is maintained in the event of minor and/or temporary disruptions to a connection to said primary link.

9. The method of claim 1, further comprising the step of:

establishing an interval during which a primary link is maintained in the event of minor and/or temporary disruptions to a connection to said primary link.

10. The redundant links monitor of claim 1, said means for selecting further comprising:

means for effecting a redundant links state decision based upon one or more viability factors.

11. A method for monitoring redundant links to an electronic network entity, comprising the steps of:

taking a failure snapshot of at least one of at least two network links and verifying viability of said links with a status capture module associated with either of a network device or network connection, wherein said links include a primary link and a secondary link, said status capture module storing and/or reporting conditions that lead up to a link failure, accommodating minor, temporary disruptions, allowing status inquiries with regard to a redundant link while maintaining a primary connection, and/or detecting link failure due to incompatible network security configuration;

periodically and actively determining the status of said secondary link; and selecting the most viable link among said primary link and said secondary link.

12. The method of claim 11, further comprising the step of:

polling a network connection with respect to said failure snapshot.

13. The method of claim 11, further comprising the step of: broadcasting said failure snapshot to a network management function.

14. The method of claim 13, said broadcasting step further comprising the step of: generating a network management trap.

15. The method of claim 9, further comprising the step of:

polling a network connection with regard to status of a standby link while an active link is maintained;

wherein said status capture module resides in a repeater environment.

16. The method of claim 11, further comprising the step of:

providing a tone detector which is operable in a first mode to detect if a standby state is maintained for a secondary link, and is operable in a second mode to detect if a remote device is responding to training tones when maintaining a degraded connection for a secondary link.

17. The method of claim 16, wherein said method is adapted to operate in an IEEE 802.12 environment.

18. The method of claim 11, said selecting step further comprising the step of:

effecting a redundant links state decision based upon one or more viability factors.

* * * * *